United States Patent
Wright et al.

(10) Patent No.: US 11,824,900 B2
(45) Date of Patent: Nov. 21, 2023

(54) ARTIFICIAL INTELLIGENCE SECURITY CONFIGURATION ENGINE

(71) Applicant: Bank of America Corporation, Charlotte, NC (US)

(72) Inventors: Timothy Andrew Wright, Bracknell (GB); Adam B. Richman, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 383 days.

(21) Appl. No.: 17/078,176

(22) Filed: Oct. 23, 2020

(65) Prior Publication Data

US 2022/0131904 A1 Apr. 28, 2022

(51) Int. Cl.
*H04L 9/40* (2022.01)
*G06N 20/00* (2019.01)
*G06F 21/57* (2013.01)
*G06F 8/61* (2018.01)

(52) U.S. Cl.
CPC ............ *H04L 63/205* (2013.01); *G06F 21/57* (2013.01); *G06N 20/00* (2019.01); *G06F 8/61* (2013.01)

(58) Field of Classification Search
CPC ....... H04L 63/205; G06N 20/00; G06F 21/57; G06F 8/61
See application file for complete search history.

(56) References Cited

U.S. PATENT DOCUMENTS

| 8,365,164 | B1 * | 1/2013 | Morgenstern ............. G06F 8/61 717/175 |
| 8,607,308 | B1 | 12/2013 | Langford et al. |
| 8,839,234 | B1 * | 9/2014 | Voronkov ............... G06F 21/10 717/172 |
| 9,967,232 | B1 | 5/2018 | Royt et al. |
| 10,275,465 | B2 | 4/2019 | Neria et al. |

(Continued)

OTHER PUBLICATIONS

"CIS Google Chrome Benchmark," http://www.itsecure.hu/library/image/CIS_Google_Chrome_Benchmark_v1.2.0.pdf, v1.2.0 Center for Internet Security, Jun. 28, 2017.

*Primary Examiner* — Noura Zoubair
*Assistant Examiner* — Thomas A Carnes
(74) *Attorney, Agent, or Firm* — Weiss & Arons LLP

(57) ABSTRACT

Artificial intelligence ("AI") apparatus and methods are provided for hardening security of software applications. Under the conventional approaches, additional manual investment implementing security policies does not yield proportional increases in combating cyber security threats. Using manual approaches, it is increasingly difficult to consistently apply multiple policies covering different software applications or versions. This results in increased risk and technical debt. Over time, these undesirable consequences exacerbate the likelihood of inadvertently introducing an adverse policy omission or change. As the scale of software application deployed across and organization increases, it becomes even more difficult to ensure that security policies tracked and consistently applied. This may result in ineffective, contradictory or duplicative configuration requirements. AI apparatus and methods provided herein ingest human-readable policy requirements and generate technical configuration settings that implement policy requirements across diverse technology platforms.

17 Claims, 7 Drawing Sheets

(56) References Cited

U.S. PATENT DOCUMENTS

| | | | |
|---|---|---|---|
| 10,430,608 B2 | 10/2019 | Peri et al. | |
| 2004/0225877 A1* | 11/2004 | Huang | G06F 21/552 |
| | | | 713/100 |
| 2014/0221066 A1* | 8/2014 | McCord | A63F 9/183 |
| | | | 463/9 |
| 2015/0332043 A1* | 11/2015 | Russello | G06F 11/3466 |
| | | | 726/22 |
| 2019/0130113 A1* | 5/2019 | Obermeier | G06F 21/577 |
| 2019/0156246 A1* | 5/2019 | Kuo | G06N 5/04 |
| 2019/0391898 A1* | 12/2019 | Vichare | G06F 9/44505 |
| 2021/0157923 A1* | 5/2021 | Mallya | G06F 21/6218 |
| 2022/0131904 A1* | 4/2022 | Wright | G06F 21/57 |

\* cited by examiner

ARTIFICIAL INTELLIGENCE SECURITY CONFIGURATION ENGINE

FIELD OF TECHNOLOGY

Aspects of this disclosure relate to using artificial intelligence ("AI") to configure security settings for software applications in a large enterprise organization.

BACKGROUND

Large enterprise organization may provide their personnel with access to various software tools. Illustrative software tools may include database access, word processing, email applications and video conferencing. Large enterprise organizations may employ over 750 k individuals. Such large enterprise organizations may utilize over 4 k different software applications.

Each of the software applications may have various options and configuration settings. Each of the personnel in the organization may have their own configuration settings and preferences for the software applications they use. These large numbers of personnel and software applications give rise to an even larger number of permutations for configuring the available software applications. The large number of configuration permutations create a technical challenge for such enterprise organizations to effectively manage and control security of software applications.

Further exacerbating this technical challenge is that software applications may be associated with various versions. The different versions of the same software application further increase the number of possible configuration settings. Personnel may use the same software application, such as a web browser. However, some personnel may be using version 2.0, other personnel version 3.5 and other personnel version 6.1. The configuration settings associated with each version of a software application may be different. Therefore, secure or preferred configuration settings developed for version 2.0 may not be directly applicable to version 6.1.

Conventionally, attempts to uniformly configure software applications in accordance with organizational security protocols and policies have been addressed through "brute force" methods. For example, information technologists may prepare different installation packages for each software application and each version of the software application. This conventional approach is time consuming and resource intensive. Furthermore, using the conventional approach, changes to configuration settings lag behind security alerts notifying an organization of changes that need to be made to configuration settings.

Additionally, because conventionally, configuration settings are developed independently for each software application, an organization must manage and update policies for multiple software applications and technologies. Thus, more investment in maintaining a policy does not yield proportional increases in effectiveness of the policy or applicability of the policy to other applications. Maintaining different policies for different software applications also creates a risk that organization-wide security policies may not be consistently applied across different applications.

Therefore, the conventional approach typically results in lower levels of consistency, increased risk of a cyber security breach and higher technical debt. Over time, the conventional approach may be associated with an increased risk of inadvertently introducing an adverse policy change or omitting a key policy consideration. In large enterprise organizations, the conventional approach results in ineffective, contradictory or duplicative security policy requirements.

It would be desirable to provide a system that utilizes AI to provide centralized, uniform configuration policies across diverse software applications, versions and hardware architectures. As described herein, ARTIFICIAL INTELLIGENCE SECURITY CONFIGURATION ENGINE provides technical solutions that ingest high level policy requirements and converts those policy requirements into technical implementation requirements for diverse technology platforms.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
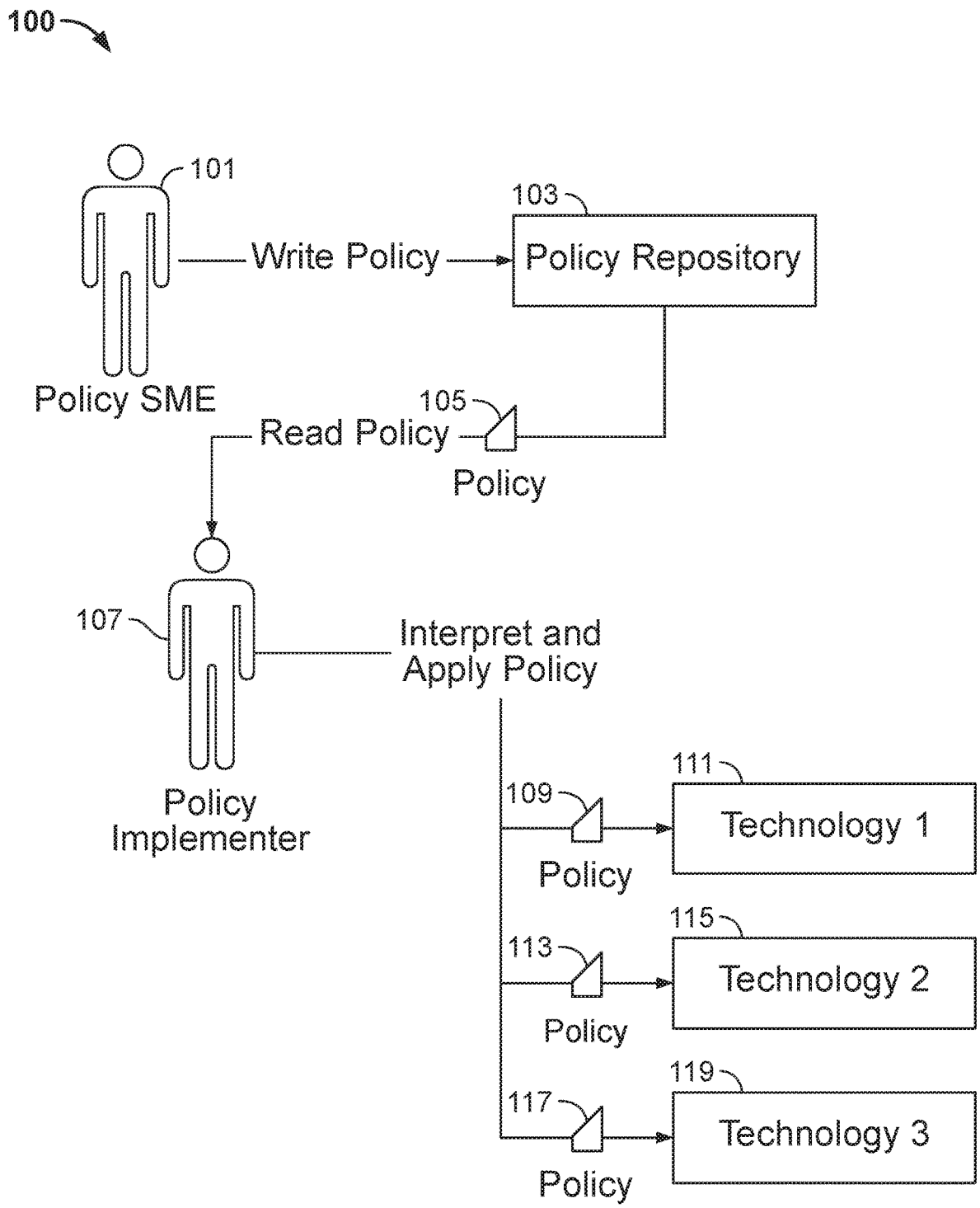
FIG. 1 shows a prior-art conventional process.

An AI configuration engine is provided. The AI engine may include computer readable code. The computer readable code, when executed by a computer system may extract human-readable policy requirements from a first storage location. The AI engine may translate the human-readable policy requirements into technical requirements for a target technology platform. The target technology platform may include a software application, a particular version of the software application or a specific hardware architecture. The AI engine may configure the target technology platform in accordance with the generated technical requirements.

Based on the generated technical requirements, the AI engine may suggest additional policy requirements. The AI engine may present the additional policy requirements in a human-readable format. For example, the AI engine may identify gaps in the human-readable policy requirements. The gaps may represent security settings that are not utilized or addressed in a security policy. The gaps may represent security settings that are available for one application or version thereof, and not for another application or version.

The AI engine may identify the policy gaps based on comparing a first human-readable policy written for a first software application to a second human-readable policy written for a second software application. The AI engine may identify the gaps based on comparing a first human-readable policy written for a first version of a software application to a second human-readable policy written for a second version of the software application. The AI engine may identify the gaps based on comparing technical requirements generated based on ingesting a first human-readable policy written to technical requirements generated based on a second human-readable policy.

The AI engine may compare a human-readable policy or technical requirements generated based on the policy to internal security benchmarks deployed by the enterprise organization. The AI engine may generate technical requirements based on ingesting the internal security benchmarks. The AI engine may compare an internal human-readable policy to industry security benchmarks. Industry security benchmarks may include guidelines formulated by the Center for Internet Security, Inc. ("CIS") of East Greenbrush, New York. The AI engine may compare a human-readable policy to any suitable benchmark or combination of benchmarks.

The AI engine may present additional configuration setting needed to close a coverage gap. The AI engine may present the additional configurations settings in terms of technical requirements needed to close the identified coverage gap. The AI engine may present the additional configurations settings in human-readable format. The AI engine may present the additional configurations settings in terms of technical requirements needed to configure the target technology platform in accordance with the additional technical requirements. Such a proactive machine learning approach may reduce gaps in security policies and harden the security settings of software applications.

The target technology platform may be one of a plurality of target technology platforms. The AI engine may translate human-readable policy requirements associated with a first technology platform into technical requirements for each of the plurality of target technology platforms. The AI engine may configure each of the plurality of target technology platforms in accordance with the technical requirements generated based on the translating.

The AI engine may utilize machine learning algorithms to compare security policies or identify gaps in security policies. Such algorithms may include unsupervised machine learning algorithms. Unsupervised machine learning algorithms organize undefined input data by detecting patterns and or otherwise attempting to discern structure within the undefined data. The algorithm may utilize known patterns or structure associated with defined data sets. Unsupervised machine learning algorithms may only require a relatively small defined data set to understand a relatively larger undefined data set. Machine learning algorithms may use attributes of the defined data as a key to understand the undefined data set. Over time, the algorithm may adapt its strategy to better understand the impact/consequences of various interpretations and attempt to leverage that knowledge to interpretate security policies.

The AI engine may utilize any suitable machine learning algorithm. Exemplary algorithms may include one or of the following machine learning algorithms: Naïve Bayes Classifier Algorithm, K Means Clustering Algorithm, Support Vector Machine Algorithm, Apriori Algorithm, Linear Regression, Logistic Regression, Artificial Neural Networks, Nearest Neighbors, Random Forests and/or Decision Trees. Any suitable machine learning algorithm may be utilized. By utilizing machine learning algorithms, the AI engine may analyze a security policy that is complex and documented in one or more formats. The machine learning algorithm may learn from analysis of known security policies, such as CIS benchmarks.

The machine learning algorithms may learn to identify patterns or other guideposts for successfully deciphering a structure of an organization's security policies. The machine learning algorithms may determine a scope of permissions associated with a term included in a security policy. The machine learning algorithms may extrapolate how to apply the determined scope to other versions of the software application and to other technology platforms.

Furthermore, after deciphering the structure of a security policy and scope of human-readable terms, machine learning algorithms may learn how to integrate technical requirements corresponding to human-readable terms into security policies uniformly across different sub-divisions of an enterprise organization and across different technology platforms.

For example, based on technical requirements for each of a plurality of software applications, the AI engine may suggest additional policy requirements for each of the software applications. The AI engine may determine (e.g., based on machine learning) configuration settings that correspond to technical requirements for implementing policy requirements expressed in a human-readable format.

The AI engine may present determined technical requirements in human-readable format. The AI engine may utilize a policy development environment to covert technical requirements into human-readable format. The AI engine may translate the additional human-readable policy requirements into additional technical requirements for any suitable technology platform.

The AI engine may configure multiple target technology platforms in accordance with generated technical requirements. The AI engine may interface with configuration system and provide configuration settings for the software application to the configuration system. The configuration system may interface with one or more of the technology platforms and configure the technology platforms in accordance with the technical requirements generated by the AI engine.

The AI engine may generate a mapping catalogue of configuration settings for a target technology platform. The mapping catalogue may provide a repository that links human-readable policy terminology to technical requirements and corresponding configuration settings for a technology platform. The AI engine may generate the mapping catalogue after configuring a target technology platform in accordance with generated technical requirements. The AI engine may generate a mapping after the target technology platform has been configured in accordance with the additional technical requirements. The AI engine may consult the mapping catalogue before configuring a target technology platform in accordance with technical requirements generated by the AI engine.

The AI engine, after detecting that a target technology platform has been configured in accordance with generated technical requirements (corresponding to human-readable policy inputs), may trigger testing of the reconfigured target technology platform. For example, the AI engine may generate one or more test inputs formulated to confirm that the target technology platform has been configured in accordance with the generated technical requirements.

The AI engine may transfer the test inputs to a testing system. The testing system may monitor a response of the target technology platform to the test inputs. The testing system may provide the responses to the AI engine. The AI engine may determine whether the responses indicate that the target technology platform is performing in accordance with the generated technical requirements. Based on the response to the test inputs, the AI engine and/or the test system may determine whether the target technology platform is performing in accordance with the human-readable technical requirements expressed in a security policy.

The AI engine may interface with an installation package generator. The AI engine may provide technical requirements for configuring a technology platform to the installation package generator. The installation package generator may prepare installation files for installing or deploying a target technology platform in accordance with technical requirements generated by the AI engine. The installation package generator may prepare installation files for multiple versions of a target technology platform based on a single set of technical requirements generated by the AI engine. The installation package generator may prepare installation packages that are specific to a hardware architecture or other user-specific criteria.

In some embodiments, the installation package generator may generate at least one configuration file for a target technology platform based on technical requirements generated by the AI engine. In some embodiments, the AI engine itself may generate a configuration file based on the technical requirements. An installation package may read a configuration file during installation of a technology platform. The installation package may install a target technology platform on a user device based on configuration settings included in a configuration file.

When a target technology platform is installed on a workstation or other hardware architecture, the installation package may include provide computer executable instructions for configuring the target technology platform in accordance with the technical requirements generated by the AI engine. During installation of the target technology platform, the installation package may be configured to search for an associated configuration file that records the technical requirements.

Apparatus for an AI engine is provided. The AI engine may include computer readable code. The computer readable code, when executed by a computer system may harden security of a software application. The AI engine may ingest a human-readable security policy. The human-readable security policy may describe how a software application should operate to implement security goals or requirements of an enterprise organization. The human-readable security policy may describe limitations on functionality of the software application. The limits may be specific to target users. The limits may be specific to target operating environments. The limits may be specific to any suitable target technology platform.

The AI engine may translate human-readable security policies into technical configuration settings for a target software application. The technical requirements generated by the AI engine may be included in an installation package for the target software application. In some embodiments, the AI engine may generate an installation package for the software application. In some embodiments, the AI engine may interface with an installation package generator that prepares an installation package for the target software application.

An installation package, when executed on a user device, may install the target software application on a user device in accordance with one or more human-readable security policies. The installation package may include technical requirements for implementing the human-readable security policies. The technical requirements may be generated by the AI engine.

The AI engine may dynamically update an installation package based on changes to the human-readable security policies. In some embodiments, the AI engine may update configuration settings or other technical requirements provided to the installation package generator.

The AI engine may convert changes detected in the human-readable policies into technical requirements that may be applied to a software application. In some embodiments, the AI engine may be configured to generate updates to configuration settings previously applied to a software application. The AI engine may initiate a bot or other automated computer script that updates configuration settings of the software application to reflect the changes to the human-readable security policies. For example, in some embodiments, the AI engine may provide a package installer generator with technical requirements for updating configuration settings of a software application.

The AI engine may harden security of a software application by triggering generation of a configuration file. The AI engine may instruct the installation package generator to generate the configuration file for the software application. The configuration file may include technical settings (generated by the AI engine) for the software application that implement the human-readable security policies. The configuration file may be integrated into an installation package for the software application such that during installation of the software application on a user device, the settings in the configuration file are applied to the software application.

In some embodiments, the AI engine may provide an editor. In some embodiments, the AI engine may interface with a policy development environment that provides the editor. The editor may include a graphical user interface ("GUI"). The editor may accept human-readable input. The human-readable input may express organizational policy goals. The AI engine may ingest the human-readable inputs received via the editor and determine technical requirements that implement the configuration expressed by the human-readable inputs.

The AI engine may build a mapping catalogue that links human-readable inputs to technical configuration settings. The AI engine may build the mapping catalogue based on an initial set of relationships linking human-readable inputs to technical configuration settings. In some embodiments, the initial set of relationships may be formulated by a human technician. In some embodiments, the initial set of relationships may be generated by applying a machine learning algorithm to software applications that are known to be configured in accordance with a human-readable security policy.

The AI engine may monitor human-readable inputs entered using the editor. The AI engine may consult the mapping catalogue and correlate the entered human-readable inputs to technical configuration settings for a technology platform. Based on correlating the human-readable inputs to technical configuration settings, the AI engine may determine additional technical configuration settings that should be applied to the software application.

For example, the AI engine may extrapolate a goal or purpose associated with human-readable policy inputs. The AI engine may determine that the goal or purpose expressed in the human-readable policy inputs may require different technical configuration settings for different versions or hardware architectures. The AI engine may generate a human-readable translation of the additional configuration settings for each version or hardware architecture. The AI engine may generate human-readable outputs that express the configuration settings generated by the AI engine. The AI engine may provide the configuration settings it generates to the policy development environment.

Based on human-readable inputs entered for a first software application the AI engine may generate technical configuration settings that implement the policy or security goals expressed in the human-readable inputs for a second software application. Based on technical configuration settings generated for the first software application, the AI engine may extrapolate how to implement corresponding technical settings and associated policy/security goals for the second software application.

For example, a first software application may be a web browser. The human-readable inputs may express the following illustrative policy/security goals:
Users may not run outdated plugins
Block third party cookies
Disable autofill
Do not import passwords
Limit remote access configurations
Require specific home page settings
Require specific http authentication settings
Require specific proxy server settings The AI engine may determine the technical requirements needed to configure the web browser in accordance with the human-readable inputs. Such technical requirements may include changes to registry entries.

Based on the configuration settings generated for the web browser, the AI engine may generate technical configuration settings and recommendations for other software applications. For example, the AI engine may recommend the following configuration settings for a word processing application:
Disable automatic links
Do not open blocked files
Open files from Internet zone in protected mode
Open email attachments in protected mode
Scan encrypted macros For example, the AI engine may recommend the following configuration settings for an email application:
Require authentication with mail server
Do not allow user to change folder permissions
Enable remote procedure call encryption
Disable auto download of attachments
Set specific email application as default application The AI engine may generate technical configuration settings for the web browser application based on the human-readable policy inputs provided for the web browser. The AI engine may generate technical configuration settings for the word processor and email application based on the human-readable policy inputs provided for the web browser.

The AI engine may interact with a feedback engine. In some embodiments, the AI engine may include the feedback engine. The AI engine may interact with the feedback engine in real-time. The feedback engine may determine an effectiveness of the configuration settings for hardening security of a software application. In some embodiments the feedback engine may translate the effectiveness into human-readable outputs presented via the editor of the policy development environment.

The AI engine may interact with an installation package generator. In some embodiments the AI engine may include the installation package generator. The AI engine may provide the installation package generator with technical configuration settings generated based on the human-readable inputs received via the editor. The installation package generator may generate a corresponding configuration file for each of the plurality of software applications. The installation package generator may generate the corresponding configuration file based on the technical requirements corresponding human-readable input entered for a single software application.

The installation package generator may create a corresponding installation package for each of a plurality of software applications. The installation package generator may update each of the corresponding installation packages in response to changes to a human-readable security policy.

The AI engine may further harden security of a software application by extracting configuration settings for the software application from an instance of the software application that has been manually configured in accordance with a human-readable security policy. For example, the software application may be manually configured by a human technician. The AI engine may ingest the configuration settings applied to the manually configured software application.

Based on the manually entered configuration settings, the AI engine may extrapolate configuration settings for other versions of the software application. Based on the manually entered configuration settings, the AI engine may generate technical configuration settings for other software applications. Based on the manually entered configuration settings, the AI engine may generate mappings of technical configuration settings to human-readable inputs.

An AI method for hardening security of software applications is provided. Methods may include ingesting a human-readable description of a security policy. Methods may include inputting the human-readable description into an AI engine. The AI engine may include a policy engine. The policy engine may identify technical configuration settings that implement the goals or policies described in the human-readable description. Methods may include using the AI engine to generate technical configuration requirements for a plurality of software applications.

Methods may include using the AI engine, generating the technical requirements for different versions of each of the plurality of software applications. Methods may include using the AI engine, generating the technical requirements for a plurality of software applications that operate on different hardware architectures.

Methods may include generating a mapping catalogue of technical configurations that correspond to human-readable descriptions. The mapping catalogue may include a graphical depiction of coverage for a human-readable policy. The graphical depiction may be overlayed on a graphical depiction corresponding to a security benchmark. The graphical depiction may identify gaps in a security policy based on areas that are included in the security benchmark and not by the security policy.

The graphical depiction may show additional technical configurations that are not within the literal scope of the human-readable description. The AI engine may suggest implementing the additional technical configurations to further the goals expressed by the human-readable policy. The graphical depiction may allow a human operator to select graphically displayed configuration settings generated by the AI engine. The AI engine may trigger implementation of the selected technical configuration settings.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 shows prior art process 100. Process 100 may begin with user 101 writing a security policy. The security policy may be stored in repository 103. User 101 may write a policy for a target software application. The policy may be stored in repository 103 along with other policies. Each policy may be associated with a specific software application.

User 107 may locate policy 105 within repository 103. User 107 may read policy 105 and interpret how to apply policy 105 to the target software application. Applying policy 105 may include manually changing configuration settings of the target software application.

Policy 105 may include general security guidelines. User 107 may read policy 105 and interpret how to apply policy 105 to other versions of a software application. User 107 read policy 105 and interpret how to apply policy 105 to other software applications. Based on examination of policy 105, user 107 may prepare policies 109, 113 and 117.

Policies 109, 113 and 117 are specific to technologies 111, 115 and 119. Each of technologies 111, 115 and 119 may represent different software applications. Each of technologies 111, 115 and 119 may represent a different version of a single software applications. Each of technologies 111, 115 and 119 may represent different hardware architectures.

Prior-art process 100 shows the challenge of uniformly configuring software applications using a "brute force" process. Large enterprise organization may employ over 750 k individuals. Such large enterprise organizations may utilize over 4 k different software applications. The large number of configuration permutations create a technical challenge for such organizations to manage and control security of software applications. Users 101 and 107 must manually prepare and regularly update policies for each software application and hardware architecture. Therefore, process 100 is unsuitable for managing and implementing configuration settings for large enterprise organizations.

Figure 2:
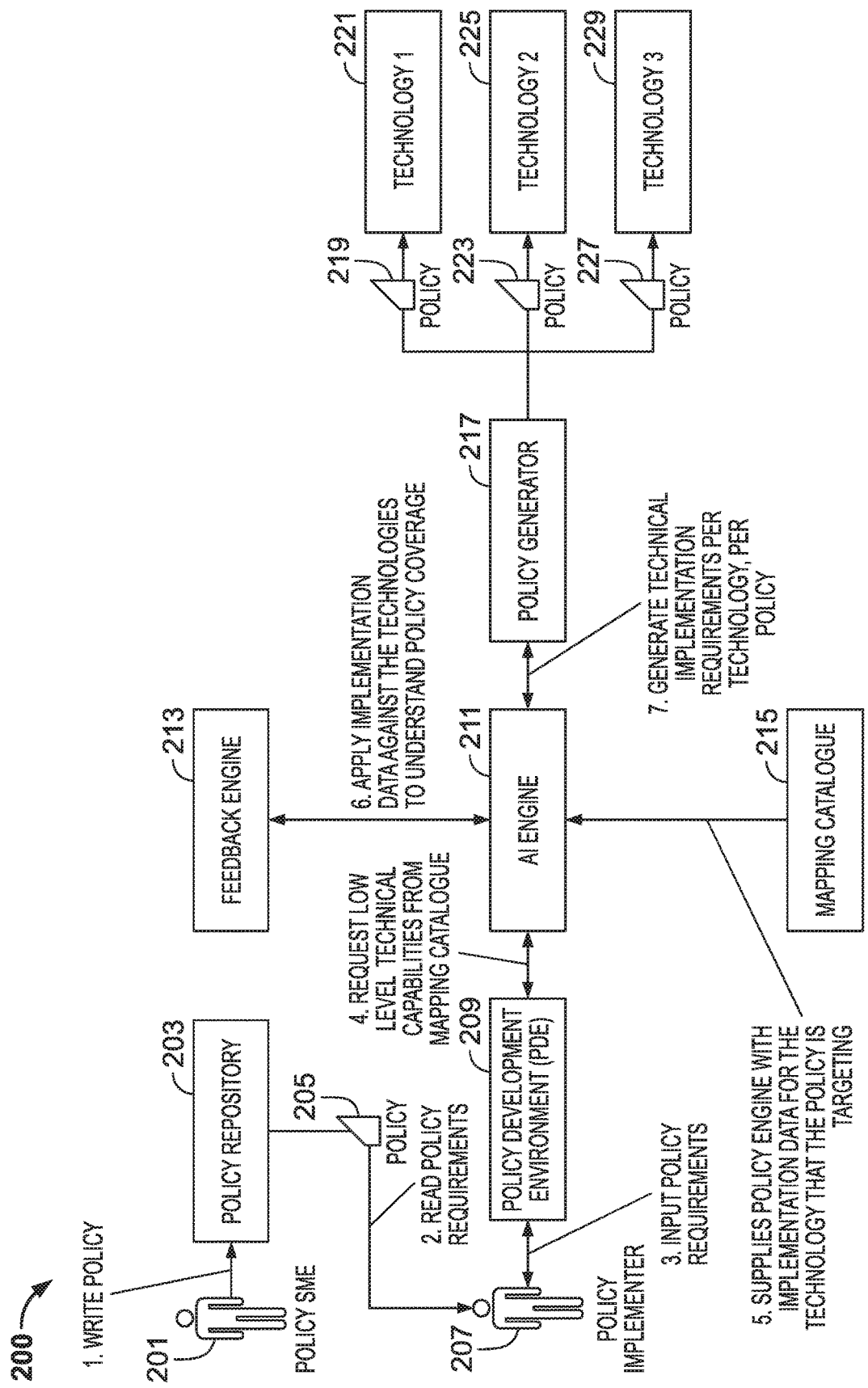
FIG. 2 shows an illustrative process in accordance with principles of the disclosure.

FIG. 2 shows illustrative process 200 in accordance with the principles of this disclosure. Process 200 utilizes AI engine 211 to for users 201 and 207 to generate centralized, consistent configuration settings for multiple software applications across diverse technology platforms.

Process 200 begins with user 201 writing security policy 205. User 201 may be a subject matter expert ("SME") that understands operational concerns and challenges within an enterprise organization. Policy 205 may include aspirational goals and guidelines that should apply across technology platforms deployed by the enterprise organization. Policy 205 may be stored in repository 203.

User 207 may be an implementer charged with enacting the goals and guidelines described in policy 205. User 207 may read policy 207 and utilize policy development environment ("PDE") to generate configuration settings for a target software application or hardware architecture that implement policy 205. PDE 209 may include an editor and user 207 may enter human-readable inputs into PDE 209. The human-readable inputs may describe how a technology platform should perform to conform with policy 205.

PDE 209 allows user 207 to enter human-readable inputs that are converted into technical configuration settings by AI engine 211. PDE 209 may provide real-time policy syntax checks on the human-readable inputs entered by user 207. PDE 207 may interact with AI engine 211 in real time to inform user 207 of the effectiveness/coverage/impact of the configuration settings generated by AI engine 211 that correspond to the entered human-readable input. Configuration settings generated by AI engine 211 may be mapped against configuration settings associated with benchmark security guidelines.

PDE 209 submits human-readable inputs to AI engine 211. AI engine 211 may convert the human-readable inputs entered by user 207 into technical configuration settings that implement the policy goals set forth in policy 205. AI engine 211 may dynamically update generated configuration settings to ensure ongoing adherence to policy 205. Dynamic updates may adjust configuration settings in response to updates to a software application, new versions of a software application or detected vulnerabilities in a software application. The AI engine 211 may maintain a log of which software applications and application versions are supported by AI engine 211.

AI engine 211 may include mapping catalogue 215. Mapping catalogue 215 includes a repository of human-readable policy goals that are mapped to technical configuration settings. AI engine 211 may access mapping catalogue 215 to determine a technical configuration setting that corresponds to a human-readable input entered by user 207 using PDE 209.

AI engine 211 may include feedback engine 213. Feedback engine 213 provide user 207 with output showing an effectiveness/scope of configuration settings generated by AI engine 211. Feedback engine 213 may attempt to compare goals described in policy 205 to technical configuration settings generated by AI engine 211. Feedback engine 213 may compare configuration settings generated by AI engine 211 for a first application to configuration settings applied to a second application. The second application may be a different version of the first application. Feedback engine 213 may show user 207 how the goals of policy 205 are implemented in different applications.

AI engine 211 may include policy engine 217. Policy engine 217 may extrapolate configuration settings generated for a target software application to other applications. Policy engine 217 may generate a specific implementation of configuration settings generated for any suitable technology platform.

Process 200 shows policy engine 217 has generated policies 219, 223 and 227 based on goals expressed in human-readable policy 205. Policy 219 may be generated with specific configuration settings for technology platform 211. Policy 223 may be generated with specific configuration settings for technology platform 225. Policy 227 may be generated with specific configuration settings for technology platform 229.

Figure 3:
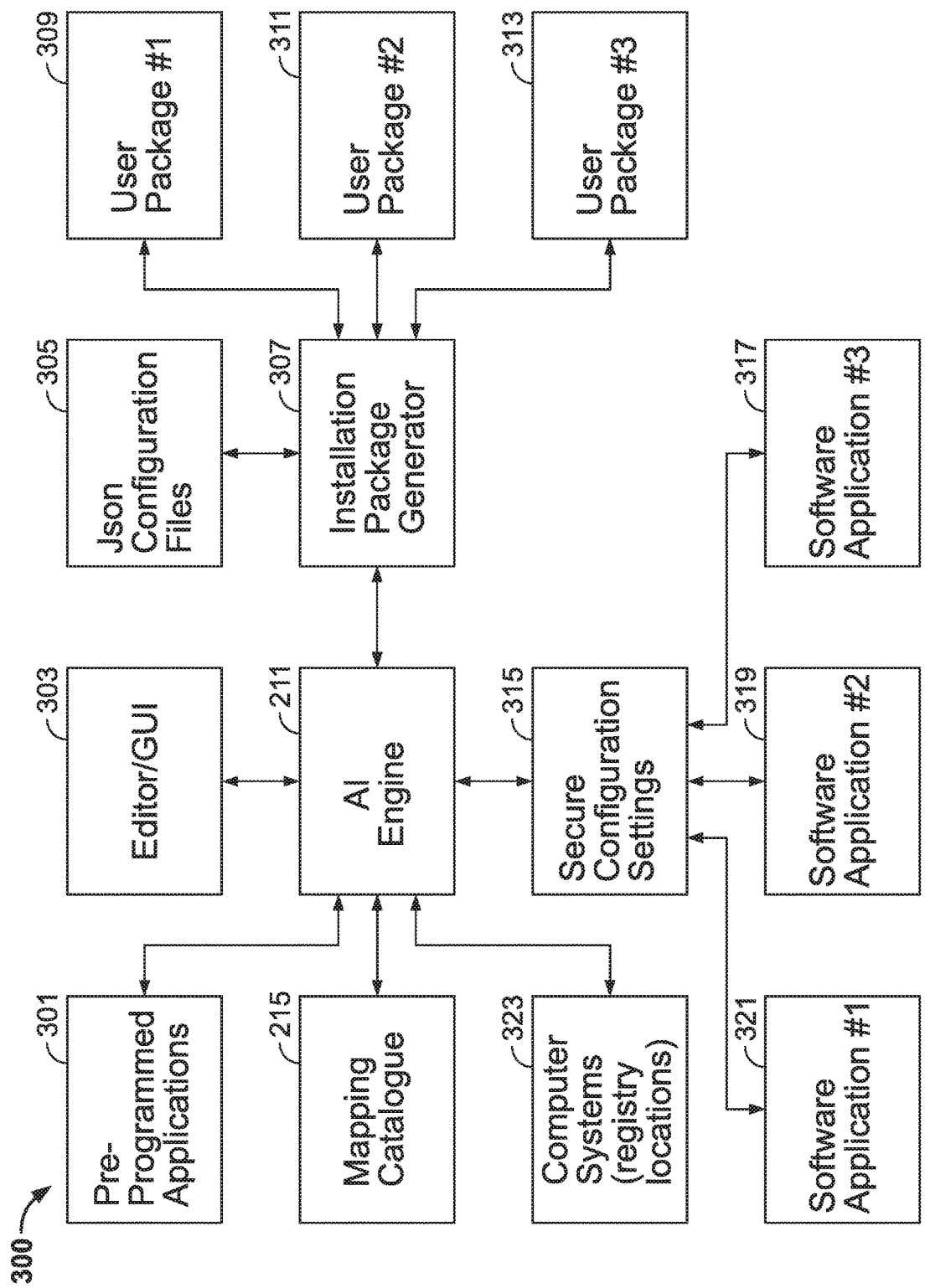
FIG. 3 shows an illustrative system in accordance with principles of the disclosure.

FIG. 3 shows illustrative system 300. System includes AI engine 211. AI engine 211 may utilize a first machine learning model for generating or changing configuration settings associated with a technology platform. AI engine 211 may utilize a second machine learning model for understanding how to apply configuration settings generated for a first technology platform to a second technology platform. AI engine 211 may utilize machine learning algorithms to understand the impact or importance of different configuration settings by ingesting pre-programmed applications 301. Pre-programmed applications 301 may include configurations settings that have been manually generated to conform with a security policy.

Illustrative machine learning algorithms utilized by AI engine 211 may include one or more of the following machine learning algorithms: Naïve Bayes Classifier Algorithm, K Means Clustering Algorithm, Support Vector Machine Algorithm, Apriori Algorithm, Linear Regression, Logistic Regression, Artificial Neural Networks, Nearest Neighbors, Random Forests and/or Decision Trees. AI engine 211 may utilize any suitable machine learning algorithm.

AI engine 211 may be run on a computer system. The computer system may be a network connected computer system. The computer system, as disclosed herein, may include a processor circuit. The processor circuit may control overall operation of the computer system and its associated components. The processor circuit may include hardware, such as one or more integrated circuits that form a chipset. The hardware may include digital or analog logic circuitry configured to perform any suitable (e.g., logical) operation.

The computer system may include one or more hardware components. Hardware components may include I/O circuitry, such as a transmitter device and a receiver device and may interface with fiber optic cable, coaxial cable, telephone lines, wireless devices, physical network layer hardware, a keypad/display control device or any other suitable encoded media or devices. Hardware components may include peripheral devices, such as counter timers, real-time timers, power-on reset generators or any other suitable peripheral devices. Hardware components may include one or more logical processing devices, which may compute data structural information, structural parameters of the data, or quantify indices.

Hardware components may include transitory and non-transitory machine-readable memory. Machine-readable memory may be configured to store, in machine-readable data structures: machine learning algorithms, AI algorithms, or any other suitable information or data structures. Components of the computer system may be linked by a system bus, wirelessly or by other suitable interconnections. System components may be present on one or more circuit boards. In some embodiments, the components may be integrated into a single chip. The chip may be silicon-based.

The computer system may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable the computer system to perform various functions. For example, the non-transitory memory may store software applications such as an operating system, application programs, and an associated database. Some or all of computer executable instructions of AI engine 211 may be embodied in hardware or firmware components of the computer system.

The computer system may include cloud computing and virtualization implementations of software. Such implementations may be designed to run on a physical server supplied externally by a hosting provider, a client, or other virtualized platform. Software application programs, which may be used by the computer system, may include computer executable instructions for invoking user functionality related to communication, such as email, short message service ("SMS"), and voice input and speech recognition applications. Software application programs may utilize one or more algorithms, as disclosed herein, that generate configuration settings, configuration files, installation packages, mapping catalogues or any other suitable task.

The computer system may include a communication circuit. The communication circuit may include a network interface card or adapter. When used in a WAN networking environment, the computer system may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and the computer system may be operated in a client-server configuration to permit retrieval of web pages from a web-based server. Web browsers can be used to display and manipulate data on web pages.

The computer system may include various other components, such as a display, battery, speaker, and antennas. Network connected systems may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

The computer system may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices, mobile phones, multiprocessor systems, minicomputer systems, microprocessor systems, mainframe computers, distributed computing environments that include any of the above systems or devices, and the like.

The computer system may utilize computer-executable instructions, such as program modules, executed by a processor. Generally, program modules include routines, programs, objects, components, data structures, etc. that perform particular tasks or implement abstract data types. The computer system may be operational with distributed computing environments where tasks are performed by remote processing devices that are linked through a communications network. In a distributed computing environment, program modules may be located in both local and remote computer storage media including memory storage devices. The computer system may rely on a network of remote servers hosted on the Internet to store, manage, and process data (e.g., "cloud computing" and/or "fog computing").

The computer system disclosed herein may be produced by different manufacturers. For example, a role engineer, such as user 207 may connect to editor/GUI 303 via a first server, and AI engine 211 may be run on a second server, and mapping catalogue 215 may be run on a third server. The computer system may capture data in different formats. The computer system may use different data structures to store captured data. The computer system may utilize different communication protocols to transmit captured data or communicate with other systems. Despite such operational differences, computer servers may be configured to operate substantially seamlessly to execute machine learning models and run an AI engine across different systems operating systems, hardware or networks.

AI engine 211 may generate configuration settings 315. AI engine 211 may implement configuration settings 315 by making changes to computer registry entries 323. AI engine 211 may implement configuration settings 315 by issuing instructions to software applications 321, 319 and 317.

AI engine 211 may implement configuration settings 315 by interacting with installation packages using installation package generator 307. Installation package generator 307 may prepare software installation files that include configuration files 305. Configuration files 305 may include secure configuration settings 315 generated by AI engine 211. Installation packages may read configuration files 305 during installation of software applications 321, 319 and 317. Installation packages may install software applications 321, 319 and 317 on a user device and apply the secure configuration settings 315 included in configuration files 305.

In some embodiments, installation package generator 307 may generate discrete installation packages 309, 311 and 313. Each of installation packages 309, 311 and 313 may include installation files for the same software application. However, each of installation packages 309, 311 and 313 may include configuration files that includes settings that are specific to a hardware architecture, version or other user-specific criteria.

Figure 4:
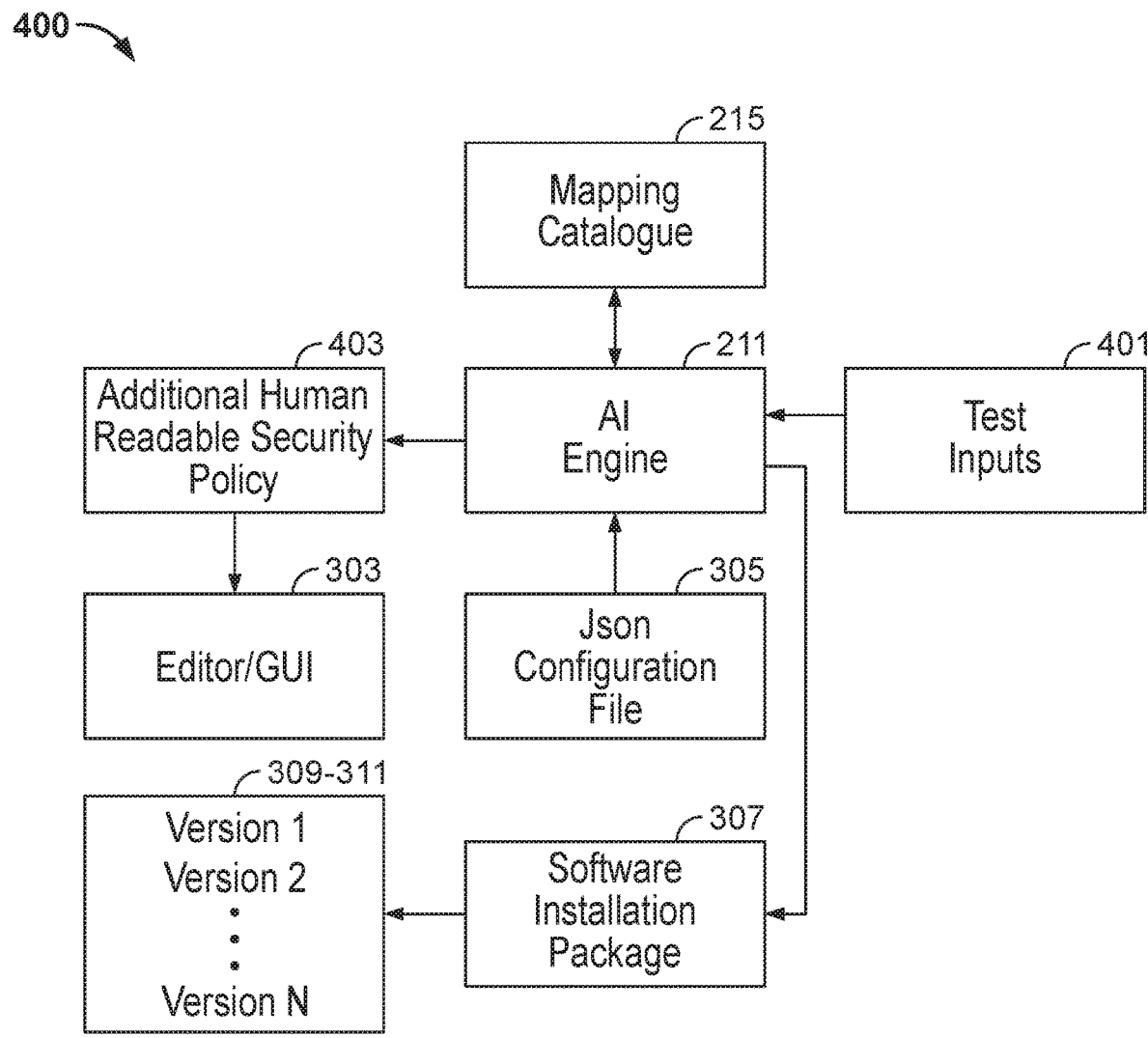
FIG. 4 shows an illustrative system in accordance with principles of the disclosure.

FIG. 4 shows illustrative system 400. System 400 shows that test inputs 401 may be provided to AI engine 211. AI engine may ingest test inputs 401 and provide test inputs 401 to one or more software applications 309-311. In some embodiments, AI engine 211 may provide test inputs 401 to a testing sub-system. The testing sub-system may interact directly with software applications 309-311. AI engine 211 may monitor a response of the software applications to test inputs 401. AI engine 211 may have previously generated configuration files 305 that include configuration settings for tested software applications 309-311.

Based on responses to test inputs 401, AI engine 211 may determine whether configuration settings included in configuration files 305 have been applied to software applications 309-311. Based on responses to test inputs 401, AI engine 211 may determine whether to change configuration settings included in configuration files 305. Based on responses to test inputs 401, AI engine 211 may generate additional human-readable policy output 403. Human-readable policy output 403 may advise user 207 on machine generated changes to configuration settings currently applied to software applications 309-311. Human-readable output 403 may be presented via editor/GUI 303. AI engine 211 may interact with mapping catalogue 215 to generate technical configuration settings based on analysis of the responses to test inputs 401.

Figure 5:
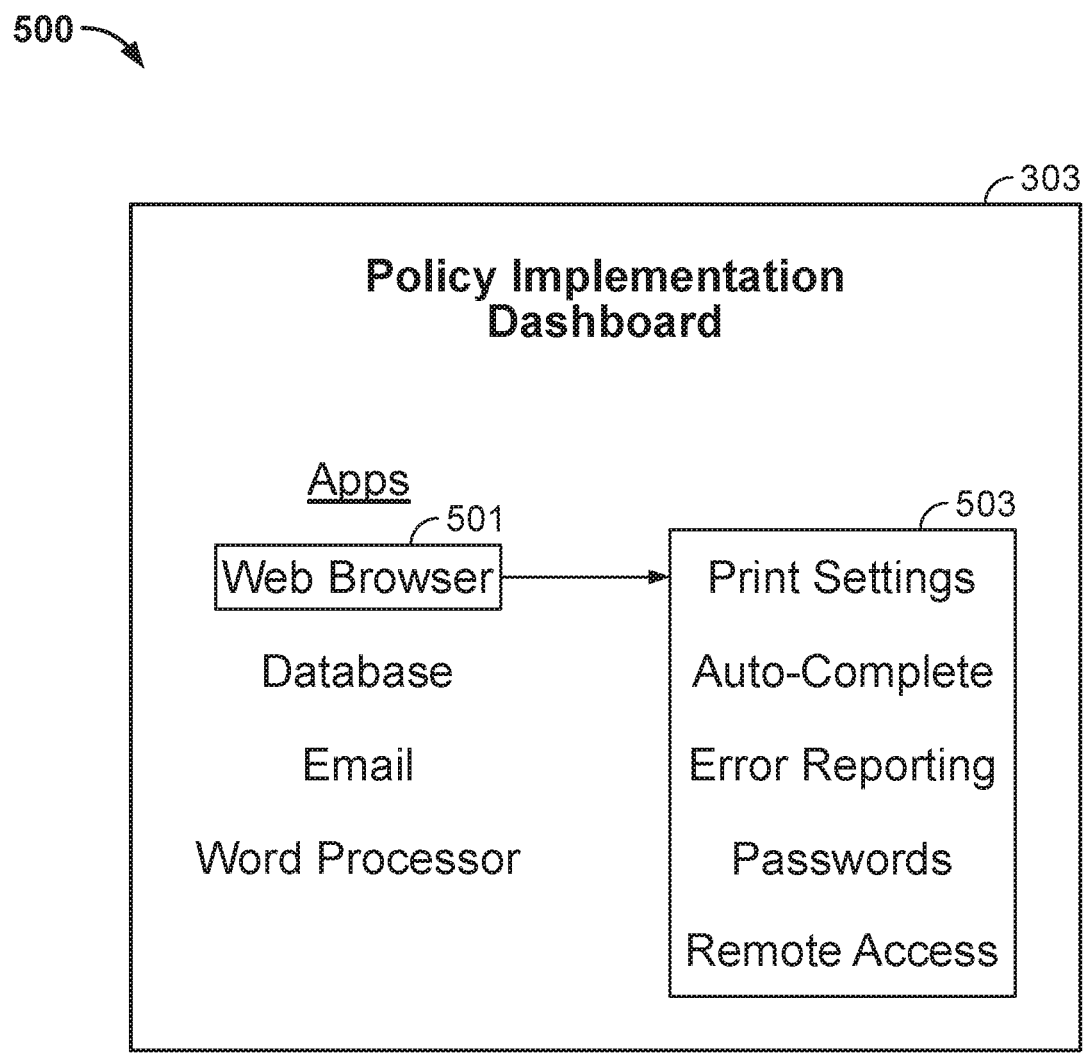
FIG. 5 shows an illustrative interface in accordance with principles of the disclosure.

FIG. 5 shows illustrative view 500 of output that may be generated by AI engine 211 and presented via editor/GUI 303. View 500 shows that editor/GUI 303 may present configuration settings that have been generated by AI engine 211. View 500 shows editor/GUI 303 displaying configuration settings 503 for web browser 501.

Figure 6:
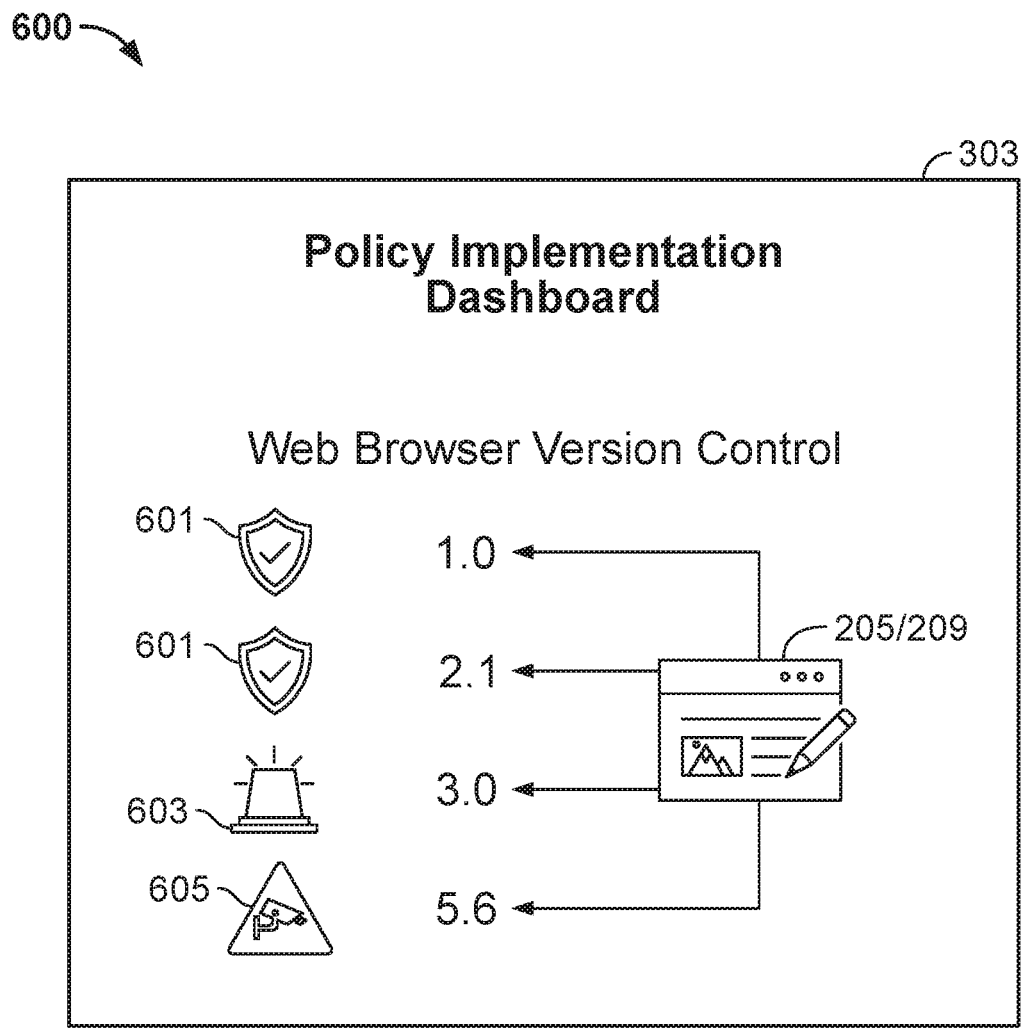
FIG. 6 shows an illustrative interface in accordance with principles of the disclosure.

FIG. 6 shows illustrative view 600 of output that may be presented via editor/GUI 303. View 600 shows that AI engine 211 has ingested security policies 205 and 207. Based on the human-readable inputs in policies 205 and 207, AI engine 211 has generated configuration settings for different versions of a software application (e.g., versions 1.0, 2.1, 3.0 and 5.6). The configuration settings generated by AI engine 211 may provide technical requirements that implement the goals of policies 205 and 207.

View 600 shows that AI engine 211 has also generated an assessment of the configuration settings applied to the different versions of the software applications. View 600 shows that AI engine 211 has determined that versions 1.0 and 2.1 meet a target security benchmark and have been assigned approval icon 601. Such security benchmarks may include security guidelines formulated for a technology platform.

View 600 shows that AI engine 211 has determined that version 3.0 does not meet a target security benchmark. Version 3.0 has been assigned alert icon 603. In some embodiments, AI engine 211 may generate additional configuration settings to bring version 3.0 into compliance with the target security benchmark.

View 600 shows that AI engine 211 has determined that version 5.6 has been assigned watch status 605. Watch status 605 indicates that AI engine 211 has determined additional configuration settings may be applied to version 5.6 that would further improve the security of the software application. However, the current configuration settings for version 5.6 may comply with the target security benchmark.

Figure 7:
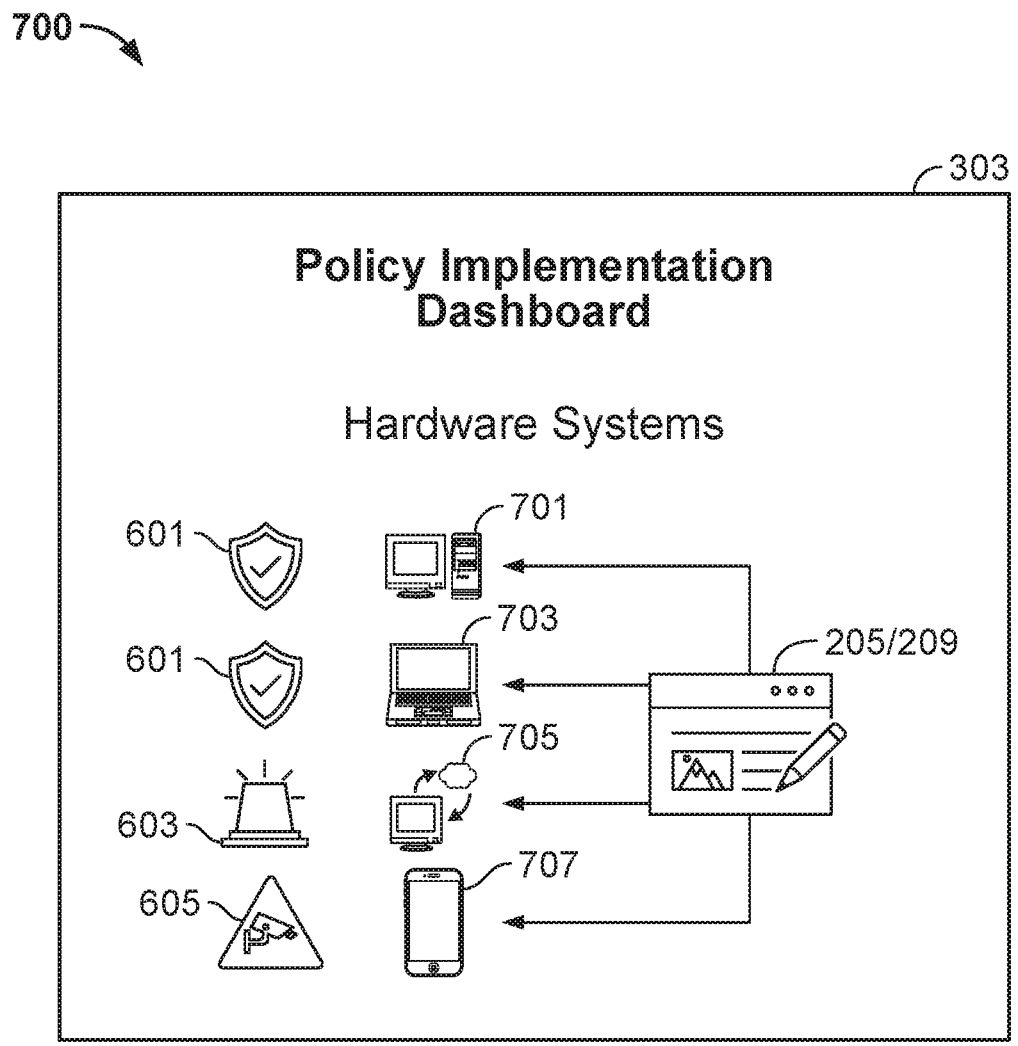
FIG. 7 shows an illustrative interface in accordance with principles of the disclosure.

FIG. 7 shows illustrative view 700 of output that may be presented via editor/GUI 303. View 700 shows that AI engine 211 has ingested security policies 205 and 207. Based on the human-readable inputs in policies 205 and 207, AI engine 211 has generated configuration settings for different hardware architectures. The configuration settings generated by AI engine 211 may provide technical requirements that implement the goals of policies 205 and 207.

View 700 shows that AI engine 211 has also generated an assessment of the configuration settings applied to the different hardware architectures. View 700 shows that AI engine 211 has determined that desktop 701 and laptop 703 meet a target security benchmark and have been assigned approval icons 601.

View 700 shows that AI engine 211 has determined that configuration settings for cloud system 705 does not meet a target security benchmark. Cloud system has been assigned alert icon 603. In some embodiments, AI engine 211 may generate additional configuration settings to bring cloud system 705 into compliance with a target security benchmark.

View 700 shows that AI engine 211 has determined that mobile device 707 has been assigned watch status 605. Watch status 705 indicates that AI engine 211 has determined that additional configuration settings may be applied to mobile device 707 that would further improve security of mobile device 707. However, the current configuration settings for mobile device 707 may comply with the target security benchmark.

Thus, methods and apparatus for ARTIFICIAL INTELLIGENCE SECURITY CONFIGURATION ENGINE are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. An artificial intelligence ("AI") configuration engine comprising computer readable code stored on a non-transitory computer-readable medium, that when executed by a computer system hardens security of a plurality of software applications by:
ingesting a first human-readable security policy relating to a first software application of the plurality of software applications;

converting the first human-readable security policy into configuration settings associated with each software application of the plurality of software applications;
ingesting a second human-readable security policy relating to a second software application of the plurality of software applications;
identifying gaps between the first and second human-readable security policies by comparing the first human-readable security policy with the second human-readable security policy, wherein the identified gaps represent security settings used in one application but not used in another application;
updating the configuration settings associated with the first or second software application to reduce each gap of the identified gaps and to harden the security of the first or the second software application;
generating a respective installation package for each of the plurality of software applications, each respective installation package, when executed on a user device, installing one software application of the plurality of software applications on the user device in accordance with the configuration settings associated with the one software application of the plurality of software applications;
dynamically updating each respective installation package based on the updating of the configuration settings in response to detecting changes to the first or second human-readable security policy;
extracting the configuration settings associated with each respective software application of the plurality of software applications from an instance of the respective software application configured manually based on the first or second human-readable security policies; and
providing real-time syntax checks for the first and second human-readable policies based on the extracted configuration settings.

2. The AI configuration engine of claim 1, wherein the computer readable code, when executed by the computer system further hardens security of each software application by:
generating a configuration file, for each respective software application, that includes the respective configuration settings associated with the respective software application; and
generating the respective installation package further comprises integrating the respective configuration file into the installation package such that during installation of the respective software application on the user device, the respective configuration settings are applied to the respective software application.

3. The AI configuration engine of claim 2, wherein the computer readable code, when executed by the computer system generates the respective configuration file by providing an editor that:
accepts human-readable input;
maps the human-readable input to the respective configuration settings for the respective software application; and
provides real-time syntax checks for the human-readable input based on the respective configuration settings.

4. The AI configuration engine of claim 3, wherein the computer readable code, when executed by the computer system interacts with a policy engine in real-time and determines an effectiveness of the respective configuration settings for hardening security of the respective software application;

wherein the effectiveness is presented graphically by the editor.

5. The AI configuration engine of claim 1, wherein the first software application is a different hardware architecture than the second software application.

6. The AI configuration engine of claim 1, wherein the plurality of software applications include a web browser, a word processing application, an email application and a database application.

7. An artificial intelligence ("AI") configuration engine comprising computer readable code stored on a non-transitory computer-readable medium, that when executed by a computer system:
extracts first human-readable policy requirements from a first storage location;
translates the first human-readable policy requirements into first technical requirements for a first target software application;
configures the first target software application software application in accordance with the first technical requirements;
extracts second human-readable policy requirements from a second storage location;
translates the second human-readable policy requirements into second technical requirements for a second target software application;
identifies gaps between the first and second human-readable policy requirements by comparing the first human-readable policy requirement with the second human-readable policy requirement, wherein the identified gaps represent security settings used in the first target software application but not used in the second target software application;
updates configuration settings associated with the first or second target software application to reduce each gap of the identified gaps and to harden the security of the first or the second target software application;
generates an installation package for each of a plurality of software applications including the first and the second target software applications, each installation package, when executed on a user device, installs one software application of the plurality of software applications on the user device in accordance with the configuration settings associated with the one software application of the plurality of software applications;
dynamically updates each installation package based on the updating of the configuration settings in response to detecting changes to the first or second human-readable policy;
based on the identified gaps, suggests additional human-readable policy requirements;
extracts technical requirements for the first target software application or the second software application from an instance of the first target software application or second target software application configured manually based on the human-readable policy requirements; and
based on the extracted technical requirements, provides real-time syntax checks for the human-readable policy requirements.

8. The AI engine of claim 7, wherein the computer readable code, when executed by the computer system:
translates the additional human-readable policy requirements into additional technical requirements; and
configures the first target software application and/or the second target software application in accordance with the additional technical requirements.

9. The AI engine of claim 7, wherein, the first target software application and the second target software application are two of a plurality of target software applications, the computer readable code, when executed by the computer system:
- translates the first and second human-readable policy requirements into respective technical requirements for each of the plurality of target software applications; and
- configures each of the plurality of target software applications in accordance with the respective technical requirements.

10. The AI engine of claim 9, wherein the computer readable code, when executed by the computer system:
- based on the respective technical requirements for each of the plurality of target software applications, suggests additional human-readable policy requirements for each target software application;
- translates the additional human-readable policy requirements into additional technical requirements; and
- configures each of the plurality of target software applications in accordance with the additional technical requirements associated with each target software application.

11. The AI engine of claim 8, wherein the computer readable code, when executed by the computer system, generates a mapping catalogue of configuration settings for the first target software application and the second target software applications:
- after configuring the first target software application and the second target software application in accordance with the respective technical requirements; and
- after configuring the first target software application and the second software application in accordance with the additional technical requirements.

12. The AI engine of claim 8, wherein the computer readable code, when executed by the computer system, after configuring the first target software application and the second software application in accordance with the respective technical requirements, applies test inputs to the first target software application and the second target software application and determines whether the first target software application and second software application perform in accordance with the respective technical requirements.

13. The AI engine of claim 7, wherein the computer readable code, when executed by the computer system, generates a configuration file when the first target software application and the second target software application are installed on a workstation, the configuration file providing computer executable instructions for configuring the first target software application and the second target software application in accordance with the first and second human-readable policy requirements.

14. An artificial intelligence ("AI") method for hardening security of a plurality of software applications, the method comprising:
- ingesting a first human-readable description of a security policy relating to a first software application included in the plurality of software applications;
- inputting the first human-readable description into a policy engine;
- using the policy engine, generating technical requirements associated with the plurality of software applications based on the first human-readable description;
- ingesting a second human-readable description of a security policy relating to a second software application included in the plurality of software applications;
- inputting the second human-readable description into the policy engine;
- identifying gaps between the first and the second human-readable descriptions by comparing the first human-readable description with the second human-readable description, wherein the identified gaps represent security settings used in one application but not used in another application;
- updating the technical requirements associated with the first or second software application to reduce each gap of the identified gaps, and to harden the security of the first software application or the second software application;
- generating an installation package for each of the plurality of software applications, each installation package, when executed on a user device, installing one software application of the plurality of software applications on the user device in accordance with the technical requirements associated with the one software application of the plurality of software applications;
- dynamically updating each installation package based on the updating of the technical requirements in response to detecting changes to the first or second human-readable descriptions;
- extracting the technical requirements associated with each respective software application of the plurality of software applications from an instance of the respective software application configured manually based on the human-readable descriptions; and
- providing real-time syntax checks for the first and second human-readable descriptions based on the extracted technical requirements.

15. The AI method of claim 14, further comprising, using the policy engine, generating the technical requirements for different versions of each of the plurality of software applications.

16. The AI method of claim 14, further comprising, using the policy engine, generating the technical requirements for each of the plurality of software applications operating on a different hardware architecture.

17. The AI method of claim 14, further comprising generating a graphical depiction of effectiveness of each security policy by showing the gaps in the technical requirements generated based on the first and second human-readable descriptions.

* * * * *